F. BERNARDI.
AIR VALVE ATTACHMENT FOR DISK WHEELS.
APPLICATION FILED APR. 10, 1919.
1,313,979.
Patented Aug. 26, 1919.
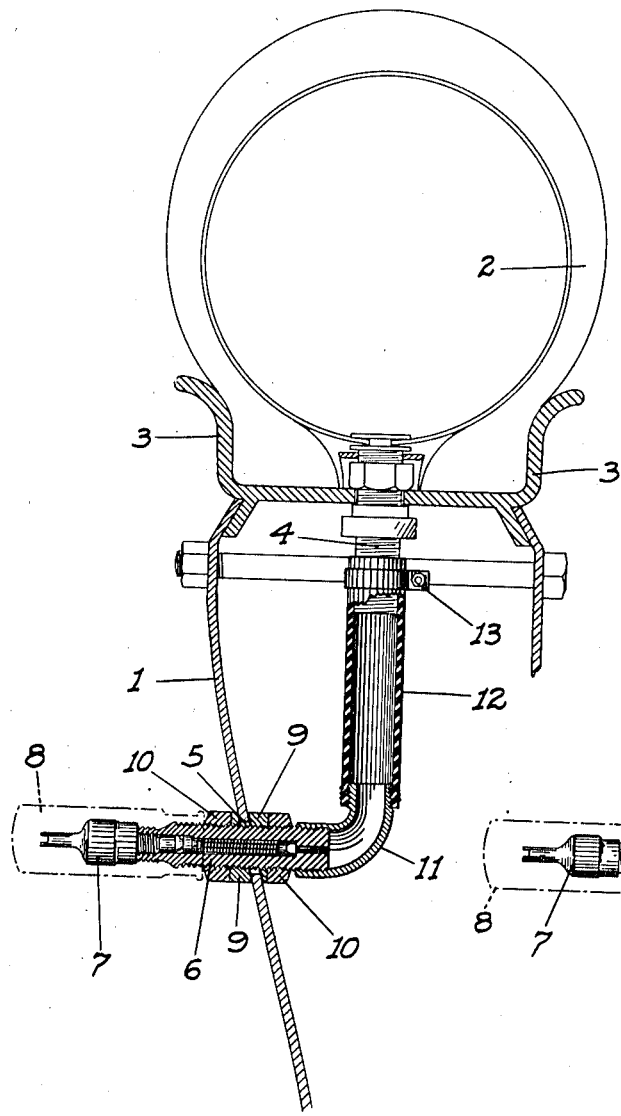
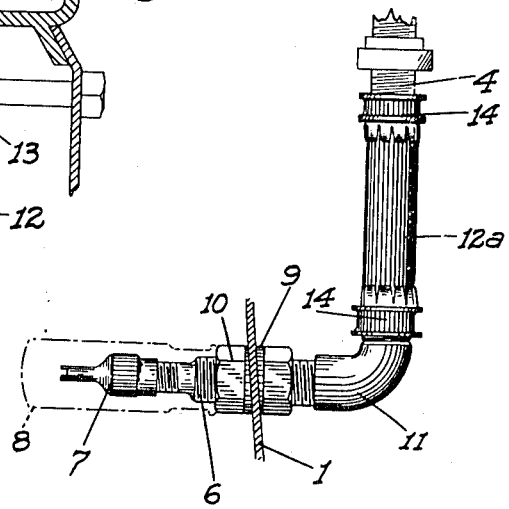
INVENTOR.
Frank Bernardi
BY
ATTORNEY

UNITED STATES PATENT OFFICE.

FRANK BERNARDI, OF STOCKTON, CALIFORNIA.

AIR-VALVE ATTACHMENT FOR DISK WHEELS.

1,313,979.

Specification of Letters Patent. Patented Aug. 26, 1919.

Application filed April 10, 1919. Serial No. 288,899.

*To all whom it may concern:*

Be it known that I, FRANK BERNARDI, a citizen of the United States, residing at Stockton, in the county of San Joaquin, State of California, have invented certain new and useful Improvements in Air-Valve Attachments for Disk Wheels; and I do declare the following to be a full, clear, and exact description of the same, reference being had to the accompanying drawings, and to the characters of reference marked thereon, which form a part of this application.

This invention relates to improvements in air valve attachments being particularly adapted to be attached to the air valve of a pneumatic tire mounted on a wheel of the solid disk type, of which there are numerous designs.

In the present state of the art, when it is desired to fill or test the tire, the air hose or tester must be attached to the valve stem back of the disk, if there is only one disk on a wheel. In this case, the wheel must be turned so that the valve is below the chassis in order to render the same accessible. This procedure is awkward and cumbersome. If the wheel has a pair of spaced disks, with the valve stem inclosed between them, a hand hole is usually provided in the outer disk to give access to the stem. This also is unhandy, as the hand projected through the hole nearly closes the same and prevents the person from seeing what he is doing.

The principal object of my invention therefore is to eliminate these inconveniences by an attachment removably secured to the valve stem and projecting through the outer disk, so that it is as simple a matter to fill and test the tire as is the case with spoked wheels.

Another object is to provide a device adaptable for connection to valve stems of different lengths, should the make of tube or valve on a wheel be changed after the installation of my device thereon.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

On the drawings, similar characters of reference indicate corresponding parts in the several views.

Figure 1 represents a fragmentary radial section through a disk wheel and tire, showing my improved device installed in the wheel and connected to the valve.

Fig. 2 is an elevation of the device, showing a modified form of valve-connection.

Referring now more particularly to the characters of reference on the drawings, the numeral 1 denotes the disk of a wheel of the single disk type, having the usual pneumatic tire 2 on the rim 3 of the wheel, which tire has the usual valve 4 projecting through the rim. Projecting through an orifice 5 in the disk in radial alinement with the valve 4 is an externally threaded valve 6. This valve is substantially of the same internal construction as the valve 4, but has no external nuts formed integral therewith as is the case with the valve 4. The usual form of valve cap 7 is screwed over the outer end of the valve 6, and a further dust cap 8 may be positioned over the entire member to protect the valve threads from dust and dirt and the valve from being damaged by striking an obstruction. The valve 6 is maintained in a horizontal position in the disk and adjustable relative thereto by means of a washer 9 on each side of the disk, wedge shaped to conform to the inward or outward slant of the disk, and lock nuts 10 bearing against the washers and threaded onto the valve 6.

Onto the inner end of the valve is threaded a street L 11, the bend thereof being so positioned as to be in vertical alinement with the valve 4.

Onto this L is securely fastened one end of a flexible hose 12, the other end being slidable over the valve 4 and clamped in position thereon by means of the usual form of ring clamp 13.

A flexible hose is preferably used for this connection, in case the parts do not exactly line up together.

In the modified form of connection shown in Fig. 2, the hose 12 is fitted with couplings 14 of the usual form on both ends and provided with the usual seat-washers, one end screwing over the L, and the other end over the valve 4.

Should the valve 4 be a little too short for the length of hose provided more washers may be placed in the couplings to form a tight joint.

It is to be understood that when installing my device, the usual spring seat in the valve 4 is to be removed therefrom to provide a free passage for air therethrough at all times, the functions of this valve being taken care of by the valve 6.

From the foregoing description it will be readily seen that I have produced such a device as substantially fulfils the object of the invention set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:—

An air valve attachment for disk wheels comprising in combination with a pneumatic tire a valve secured to the outer disk and projecting therethrough, an L secured to the inner end of the valve and projecting in horizontal alinement with the valve stem of the tire, and a flexible hose secured at one end to the L and removably clamped about the valve stem of the tire at the other end, the said valve stem having its spring-held valve removed therefrom.

In testimony whereof I affix my signature in presence of two witnesses.

FRANK BERNARDI.

Witnesses:
BERNARD PRIVAT,
F. H. CARTER.